United States Patent
Masuda

(10) Patent No.: US 8,692,896 B2
(45) Date of Patent: Apr. 8, 2014

(54) IMAGE QUALITY EVALUATION DEVICE, TERMINAL DEVICE, IMAGE QUALITY EVALUATION SYSTEM, IMAGE QUALITY EVALUATION METHOD AND COMPUTER-READABLE RECORDING MEDIUM FOR STORING PROGRAMS

(71) Applicant: NEC Casio Mobile Communications Ltd., Kanagawa (JP)

(72) Inventor: Kozo Masuda, Tokyo (JP)

(73) Assignee: NEC Casio Mobile Communications Ltd., Kawasaki-shi (JP)

( * ) Notice: Subject to any disclaimer, the term of this patent is extended or adjusted under 35 U.S.C. 154(b) by 0 days.

(21) Appl. No.: 13/776,225

(22) Filed: Feb. 25, 2013

(65) Prior Publication Data

US 2013/0170745 A1    Jul. 4, 2013

Related U.S. Application Data

(62) Division of application No. 13/004,619, filed on Jan. 11, 2011.

(30) Foreign Application Priority Data

Jan. 12, 2010 (JP) .................. 2010-004256

(51) Int. Cl.
*H04N 5/228* (2006.01)
*H04N 5/225* (2006.01)
*G06K 9/46* (2006.01)

(52) U.S. Cl.
USPC ............. 348/208.99; 348/340; 382/191

(58) Field of Classification Search
USPC .............. 348/208.1–208.4, 208.99, 222.1, 348/333.11, 333.12, 342, 354; 345/629; 382/165, 191
See application file for complete search history.

(56) References Cited

U.S. PATENT DOCUMENTS

| | | | | |
|---|---|---|---|---|
| 5,109,425 | A  * | 4/1992 | Lawton | 382/107 |
| 6,987,530 | B2 * | 1/2006 | McConica | 348/208.6 |
| 7,693,343 | B2 * | 4/2010 | Klompenhouwer et al. | 382/260 |
| 2005/0243178 | A1* | 11/2005 | McConica | 348/208.99 |
| 2009/0096897 | A1* | 4/2009 | Saito | 348/241 |

FOREIGN PATENT DOCUMENTS

| | | |
|---|---|---|
| JP | 10197226 A | 7/1998 |
| JP | 2000138952 A | 5/2000 |
| JP | 2000270208 A | 9/2000 |
| JP | 2001204049 A | 7/2001 |
| JP | 2003015026 A | 1/2003 |
| JP | 2004002952 A | 1/2004 |
| JP | 2009-038431 A | 2/2009 |

OTHER PUBLICATIONS

Office Action, dated Jun. 25, 2013, issued by the Japanese Patent Office, in counterpart application No. 2010004256.

* cited by examiner

*Primary Examiner* — Trung Diep
(74) *Attorney, Agent, or Firm* — Sughrue Mion, PLLC

(57) ABSTRACT

The present invention evaluates the quality of an image shot by a terminal device in a state closer to that seen with the eye. A computer evaluates the quality of an image obtained by shooting a photographic subject including a periodic pattern that fluctuates periodically in one direction. A Fourier transform unit accomplishes a two-dimensional Fourier transform on the image to obtain two-dimensional spatial frequency spectrum components. An analysis unit analyzes the resolution of the image on the basis of spectrum components of spatial frequencies included in the periodic pattern, among the two-dimensional spatial frequency spectrum components obtained by the Fourier transform unit, and analyzes the deterioration of the image on the basis of spectrum components other than these.

12 Claims, 19 Drawing Sheets

IMAGE QUALITY EVALUATION DEVICE, TERMINAL DEVICE, IMAGE QUALITY EVALUATION SYSTEM, IMAGE QUALITY EVALUATION METHOD AND COMPUTER-READABLE RECORDING MEDIUM FOR STORING PROGRAMS

CROSS REFERENCE TO RELATED APPLICATIONS

This application is a divisional of U.S. patent application Ser. No. 13/004,619, filed Jan. 11, 2011, which claims priority based on Japanese Patent Application No. 2010-004256, filed Jan. 12, 2010, the contents of all of which are incorporated herein by reference in their entirety.

INCORPORATION BY REFERENCE

This application is based on the Japanese Patent Application No. 2010-004256 filed on Jan. 12, 2010 and including specification, claims, drawings and summary. The disclosure of the above Japanese Patent Application is incorporated herein by reference in its entirety.

TECHNICAL FIELD

The present invention relates to an image quality evaluation device for evaluating the quality of an image taken by a terminal device such as a digital camera or a mobile phone, a terminal device equipped with this image quality evaluation device, an image equality evaluation system equipped with the image quality evaluation device or the terminal device, an image quality evaluation method for evaluating the quality of an image taken by a terminal device such as a digital camera or a mobile phone, and a computer-readable recording medium for storing programs to be executed by a computer.

BACKGROUND ART

A video resolution evaluation device for evaluating the video resolution of display devices that display videos is disclosed (refer to the Unexamined Japanese Patent Application KOKAI Publication No. 2009-38431.). This video resolution evaluation device accomplishes a Fourier transform on image data obtained by photographing with a camera a burst pattern containing a periodic pattern made up of a pattern repeated N times. Furthermore, the video resolution evaluation device evaluates the video resolution by comparing the level and position of the peaks of the periodic pattern and the phase of the periodic pattern with those of the original image.

SUMMARY

In some images displayed by a terminal device such as a mobile phone, high-frequency components are emphasized by signal processing such as edge emphasis to prevent blurring of the image. In some of this kind of images, jaggies (zigzags created at edges), an ill effect caused by emphasizing high-frequency components, and noise and so on exist. In the aforementioned video resolution evaluation device, it is difficult to reflect jaggies and noise in the evaluation results even if the overall image quality falls as a result of these.

In consideration of the foregoing, it is an exemplary object of the present invention to provide an image quality evaluation device that can evaluate the quality of an image taken by a terminal device in a state closer to that seen with the eye, a terminal device, an image quality evaluation system, an image quality evaluation method and a computer-readable recording medium for storing programs.

In order to achieve the above exemplary object, the image quality evaluation device according to a first exemplary aspect of the present invention is an image quality evaluation device for evaluating the quality of an image obtained by shooting a photographic subject including a periodic pattern that fluctuates periodically in one direction, wherein the image quality evaluation device includes:

a Fourier transform unit that accomplishes a two-dimensional Fourier transform on the image to obtain two-dimensional spatial frequency spectrum components; and an analysis unit that, among the two-dimensional spatial frequency spectrum components obtained by the Fourier transform unit, analyzes the resolution of the image on the basis of spectrum components of spatial frequencies included in the periodic pattern, and analyzes the deterioration of the image on the basis of spectrum components other than these.

The image quality evaluation method according to a second exemplary aspect of the present invention is an image quality evaluation method for evaluating the quality of an image obtained by shooting a photographic subject including a periodic pattern that fluctuates periodically in one direction, wherein the image quality evaluation method includes:

a Fourier transform process that accomplishes a two-dimensional Fourier transform on the image to obtain two-dimensional spatial frequency spectrum components; and an analysis process that, among the two-dimensional spatial frequency spectrum components obtained in the Fourier transform process, analyzes the resolution of the image on the basis of spectrum components of spatial frequencies included in the periodic pattern, and analyzes the deterioration of the image on the basis of spectrum components other than these.

The program stored on a computer-readable recording medium according to a third exemplary aspect of the present invention is:

a computer-readable recording medium for storing a program for evaluating the quality of an image obtained by shooting a photographic subject including a periodic pattern that fluctuates periodically in one direction, this program causing a computer to function as:

a Fourier transform means that accomplishes a two-dimensional Fourier transform on the image to obtain two-dimensional spatial frequency spectrum components; and an analysis means that, among the two-dimensional spatial frequency spectrum components obtained by the Fourier transform means, analyzes the resolution of the image on the basis of spectrum components of spatial frequencies included in the periodic pattern, and analyzes the deterioration of the image on the basis of spectrum components other than these.

BRIEF DESCRIPTION I/F THE DRAWINGS

These exemplary objects and other objects and advantages of the present invention will become more apparent upon reading of the following detailed description and the accompanying drawings in which.

EXEMPLARY EMBODIMENTS

The exemplary embodiments of the present invention are described in detail below with reference to the attached drawings.

First Embodiment

First, a first exemplary embodiment of the present invention is described. In this embodiment, the explanation is for an image quality evaluation system for evaluating the quality of an image shot by a camera-equipped mobile phone.

Figure 1:
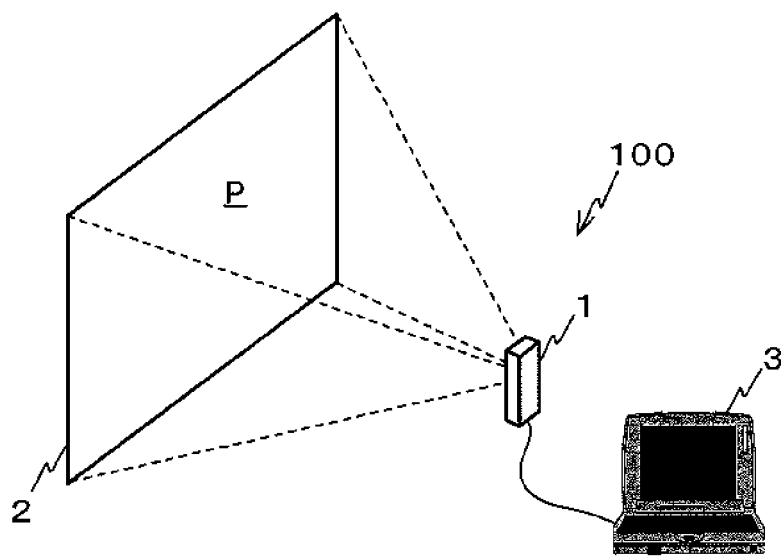
FIG. 1 is an oblique view of the entire composition of an image quality evaluation system according to a first exemplary embodiment of the present invention.

FIG. 1 shows the entire composition of an image quality evaluation system 100 according to the present exemplary embodiment. As shown in FIG. 1, the image quality evaluation system 100 is equipped with a mobile phone 1, a display device 2 and a personal computer (hereafter, abbreviated as "computer") 3.

Figure 2:
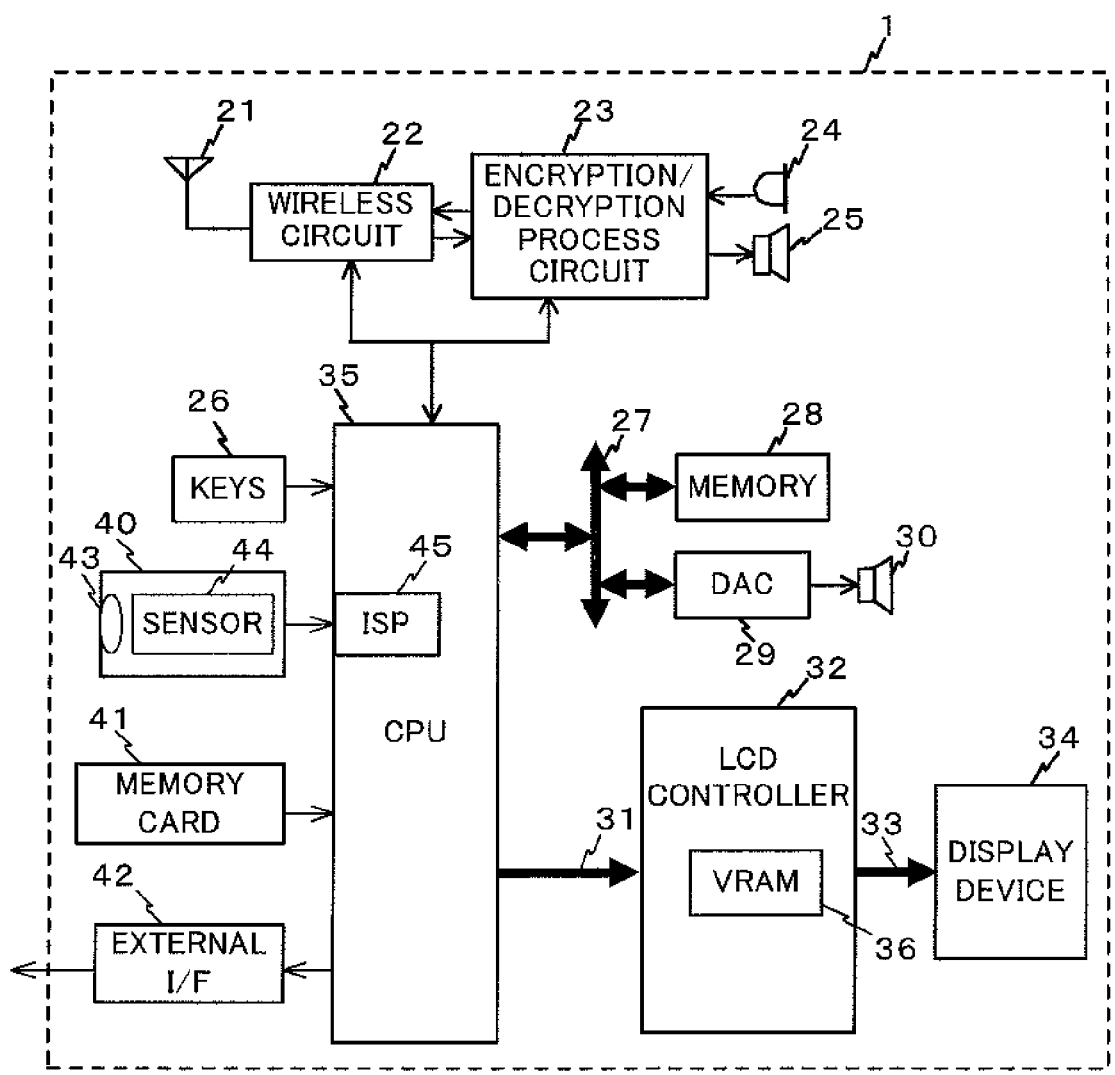
FIG. 2 is a block diagram showing the internal composition of the mobile phone of FIG. 1.

The mobile phone 1 is a camera-equipped mobile phone. FIG. 2 shows the internal composition of the mobile phone 1. As shown in FIG. 2, the mobile phone 1 has a communications antenna 21, a wireless circuit 22, an encryption/decryption processing circuit 23, a mike 24, a receiver 25, keys 26, a CPU (Central Processing Unit) bus 27, a memory 28, a DAC (Digital Analog Converter) 29, a speaker 30, a video I/F 31, an LCD (Liquid Crystal Display) controller 32, a video I/F 33, a display device 34 and a CPU 35.

The communications antenna 21 receives radio waves transmitted through the air and converts these into a high-frequency electrical signal. The converted high-frequency electrical signal is supplied to the wireless circuit 22. In addition, the communications antenna 21 converts high-frequency electrical signals supplied from the wireless circuit 22 into radio waves and transmits such.

The wireless circuit 22 demodulates high-frequency electrical signals supplied from the communications antenna 21 and inputs the result into the encryption/decryption processing circuit 23. In addition, the wireless circuit 22 modulates outputs signals from the encryption/decryption processing circuit 23, converting such into high-frequency electrical signals, and outputs these high-frequency electrical signals to the communications antenna 21.

The encryption/decryption processing circuit 23 executes a decryption process on output signals from the wireless circuit 22. The encryption/decryption processing circuit 23 outputs voice signals for telephone calls obtained as a result of this decryption process to the receiver 25. In addition, the encryption/decryption processing circuit 23 outputs text data and image data obtained in a similar manner to the CPU 35.

Furthermore, the encryption/decryption processing circuit 23 executes an encryption process on voice signals from the mike 24, text data input by operation of the keys 26 and output from the CPU 35, and image data read from the memory 28 and output from the CPU 35. The various types of data obtained as a result of this encryption process are output to the wireless circuit 22 as output signals.

The mike 24 collects sound such as the user's voice, converts this into a voice signal and outputs this to the encryption/decryption processing circuit 23. The receiver 25 outputs audio corresponding to voice signals for telephone calls output from the encryption/decryption processing circuit 23.

The keys 26 are operation keys operated by the user. The CPU bus 27 is a data bus that connects the memory 28 and the DAC 29 to the CPU 35.

Various types of control programs are stored in the memory 28. In addition, the memory 28 stores data such as a telephone directory and an address directory, ring-tone melodies, audio data such as music, and image data such as video and still images.

The DAC 29 converts digital audio signals such as ring-tone sounds and telephone call audio output from the CPU 35 via the CPU bus 27 into analog signals and supplies these to the speaker 30. The speaker 30 outputs as audio the ring-tone sounds and telephone call audio corresponding to the analog signals supplied from the DAC 29.

The video I/F 31 is an interface between the CPU 35 and the LCD controller 32. A CMOS parallel bus can be utilized as the video I/F 31, but a differential serial bus is typically used out of consideration of noise and reduction of signal line numbers.

The LCD controller 32 houses VRAM (Video RAM) 36. The VRAM 36 has the capacity to store about one screen or two screens of images. Using the VRAM 36, the LCD controller 32 creates frame images by combining one or both image data sent intermittently or partially from the CPU 35. Furthermore, the LCD controller 32 continuously reads this frame image at a frequency of around 60 Hz, and outputs this to the display device 34 via the video I/F 33.

The video I/F 33 may be a differential serial bus similar to the video I/F 31, but in the present exemplary embodiment, a CMOS parallel bus is utilized as the video I/F 33.

As the display device 34, a device with a stripe format in which a single pixel is composed of the three pixels of R (red), G (green) and B (blue) is utilized. More specifically, devices with a variety of pixel counts can be used as the display device 34, such as QVGA (320×240×RGB), VGA (640×480×RGB), wide VGA (800×480×RGB) or full wide VGA (854×480×RGB). In the present exemplary embodiment, a VGA (640×480×RGB) is utilized. In addition, in the present exemplary embodiment, the display device 34 is a liquid crystal display.

The CPU 35 reads programs from the memory 28 via the CPU bus 27, and generally controls the various above-described constituent elements by executing these programs. For example, the CPU 35 accomplishes a detection process for the operation contents of the keys 26. Furthermore, the CPU 35 detects the operation contents of the keys 26, controls the wireless circuit 22 and the encryption/decryption processing circuit 23 in accordance with the detected key operation, and accomplishes transmission processes, voice call processes, and music and image reproduction processes and the like.

On the other hand, the CPU 35 accomplishes processes related to waiting for an incoming call by controlling the encryption/decryption processing circuit 23 and the wireless circuit 22. When a call is received, the CPU 35 reads the incoming call image, the ring-tone melody and the name of the caller from the telephone directory in the memory 28. Furthermore, the CPU 35 outputs audio data to the DAC 29 and causes the caller's telephone number, name and image data to be displayed on the display device 34 via the video I/F 31, the LCD controller 32 and the video I/F 33. When talking is selected by key operation, the CPU 35 accomplishes voice call processing.

In addition to the above constituent elements, the mobile phone 1 is further equipped with a camera module 40, a memory card 41 and an external interface (I/F) 42. The camera module 40, the memory card 41 and the external I/F 42 are connected to the CPU 35.

The camera module 40 is equipped with a lens 43 and a sensor 44. The lens 43 focuses incident light on the sensor 44. The sensor 44 converts the incident light into an electrical signal through photoelectric conversion. As the sensor 44, a CMOS (Complimentary Metal Oxide Semiconductor) type or a CCD (Charge Coupled Device) type can be used. In general, a color type with R, G and B filters is used for each pixel of the sensor 44, but to simplify the explanation, a monochrome type is used here.

The electrical signal output from the sensor 44 is input into an ISP (Image Signal Processor) 45 that is part of the CPU 35. The ISP 45 applies an A/D (Analog to Digital) conversion to the output from the sensor 44, converting this into a digital signal. A noise reduction process, gamma correction and a resizing process on a predetermined number of pixels are executed on the image data converted to a digital signal.

The CPU 35 displays an image based on the image data output from the ISP 45 on the display device 34 via the video I/F 31, the LCD controller 32 and the video I/F 33. When shooting is started by operation of the keys 26, the CPU 35 digitally compresses that image data and stores it in the memory 28 or on the memory card 41. A generic type can be used as the algorithm for this digital compression. For example, JPEG (Joint Photographic Experts Group) can be used in the case of a still photograph, and MPEG (Moving Picture Experts Group) can be used in the case of video. The CPU 35 may record the image data in the memory 28 or on the memory card 41 in pre-digital-conversion data format or RGB format.

The external I/F 42 may be capable of communicating with the computer 3. Here, a USB (Universal Serial Bus) is used. The external I/F 42 is connected to the computer 3.

The display device 2 displays the evaluation pattern P shot by the camera module 40 of the mobile phone 1.

Figure 3A:
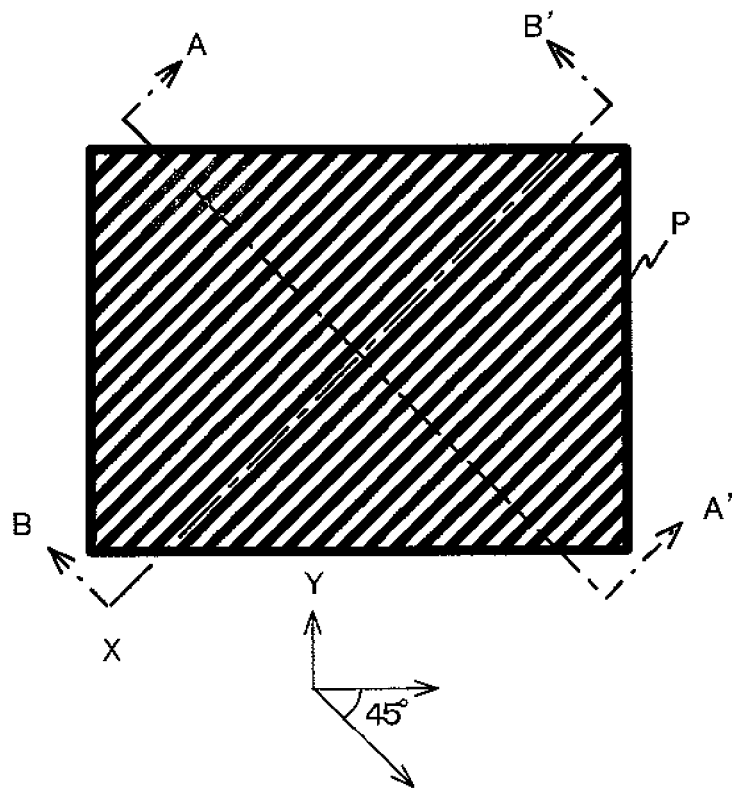
FIG. 3A shows one example of the evaluation pattern.
Figure 3B:
FIG. 3B is a graph showing the fluctuation in the brightness of the evaluation pattern P at a cross-section along A-A' in FIG. 3A.
Figure 3C:
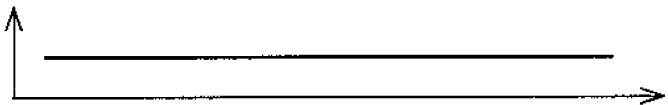
FIG. 3C is a graph showing the fluctuation in the brightness of the evaluation pattern P at a cross-section along B-B' in FIG. 3A.

FIG. 3A shows one example of an evaluation pattern P. The display device 2 displays a chart on which this evaluation pattern P has been printed. FIG. 3B is a graph showing fluctuations in the brightness in the evaluation pattern P along the cross-section A-A' in FIG. 3A. In addition, FIG. 3C is a graph showing fluctuations in the brightness in the evaluation pattern P along the cross-section B-B' in FIG. 3A. As shown comprehensively in FIGS. 3A to 3C, the evaluation pattern P is a pattern such that the brightness varies in square waveform in the A-A' direction (a first direction) inclined by 45° to the X axis, and has no periodic fluctuation in the brightness in the B-B' direction (a second direction) orthogonal to the first direction.

Image data corresponding to the evaluation pattern P photographed by the mobile phone 1 is input and the computer 3 analyzes and evaluates the quality thereof. More specifically, the computer 3 performs a two-dimensional Fourier transform on the image data obtained by photography by the mobile phone 1, acquires the frequency spectrum of that image data and analyzes the image data. For example, the computer 3 analyzes the resolution of the image data and whether or not jaggies have occurred in the image data.

Figure 4:
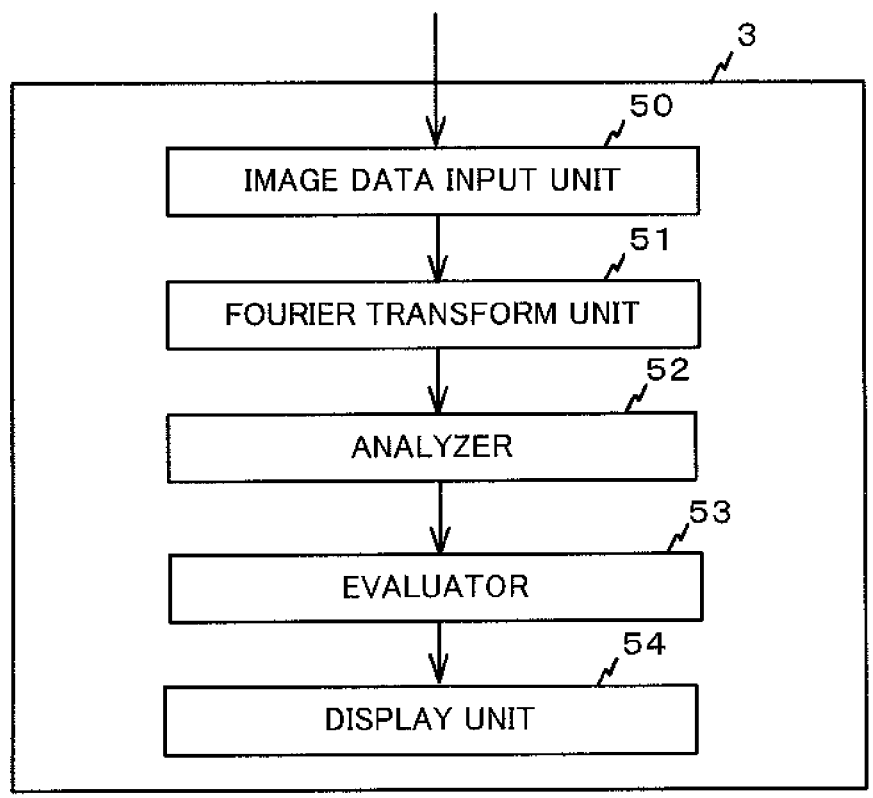
FIG. 4 is a block diagram showing the functional composition of a computer.

As shown in FIG. 4, the computer 3 is equipped with an image data input unit 50, a Fourier transform unit 51, an analyzer 52, an evaluator 53 and a display unit 54.

Image data containing the image of the evaluation pattern P photographed by the mobile phone 1 is input into the image data input unit 50. The Fourier transform unit 51 performs a two-dimensional Fourier transform on the image data input into the image data input unit 50 and obtains the two-dimensional spatial frequency spectrum components.

The analyzer 52 analyzes the resolution of the image on the basis of the spectrum components contained in the evaluation pattern P among the spectrum components of the two-dimensional spatial frequency obtained by the Fourier transform unit 51, and analyzes deterioration of the image on the basis of the spectrum components other than this.

The evaluator 53 comprehensively evaluates the quality of the image data photographed by the mobile phone 1 on the basis of the analysis results from the analyzer 52. The display unit 54 displays these evaluation results.

The operation of the image quality evaluation system 100 according to the present exemplary embodiment is described next.

The evaluation subject of the image quality evaluation system 100 according to the present exemplary embodiment is image data shot after enlarging with a zoom. Zooming formats primarily consist of optical zooming and electronic zooming (digital zooming).

Figure 5A:
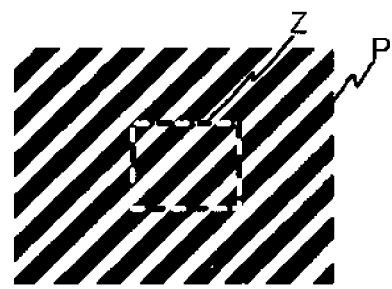
FIG. 5A is one example of the center part of the evaluation pattern of FIG. 3A.
Figure 5B:
FIG. 5B is one example of the image data in the center part shot with an optical zoom.

Because optical zooming changes the angle of incidence on the sensor 44 by controlling the focal length of the optical system, when the center part Z of the evaluation pattern P is shot after enlarging through optical zooming, as shown in FIG. 5A, the center part Z can be shot without deterioration of image quality, as shown by image data P1 in FIG. 5B.

However, because optical systems have high cost and the lens module becomes larger with an optical zoom, in the camera module 40 of the mobile phone 1, a digital zoom is employed. A digital zoom offers the advantages of being realized compactly and at low cost, but there are concerns that deterioration of image quality could occur due to enlargement of the image.

Hence, in the present exemplary embodiment, the action of the image quality evaluation system 100 will be described while comparing images shot after enlarging with a digital zoom by the camera module 40 or the like in the mobile phone 1 and images shot using an ideal zoom (optical zoom).

For example, suppose that three times the image is photographed using a digital zoom. When the image is magnified three times with a digital zoom, the number of pixels is multiplied by three by adding two pixels found through a filter operation on one pixel of the original image. Consequently, blurring and jaggies can occur in the image.

Figure 5C:
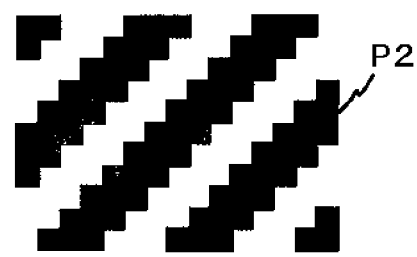
FIG. 5C is one example of the image data in the center part shot with a digital zoom.

For example, consider the case of using the nearest neighbor method to multiply the number of pixels by three by copying the value of the same pixel. The nearest neighbor method is a method that uses without changes the brightness value of the pixel whose distance is physically closest. Image data enlarged three times by a digital zoom using the nearest neighbor method is image data in which jaggies occur with a period of three pixels on the edge as shown in the image data P2 in FIG. 5C because the slanted line changes with a period of three pixels. This image data is captured by the computer 3 via the memory card 41 or the external I/F 43. The computer 3 converts this to a frequency spectrum by performing a two-dimensional Fourier transform, and analyzes the quality of the image.

The computer 3 performs a two-dimensional Fourier transform on the image data using the following formula.

(Formula 1)

$$F(u, v) = \frac{1}{2\pi} \cdot \int_{-\infty}^{\infty} \int_{-\infty}^{\infty} f(x, y) e^{-i(ux+vy)} dx dy \quad (1)$$

Figure 6A:
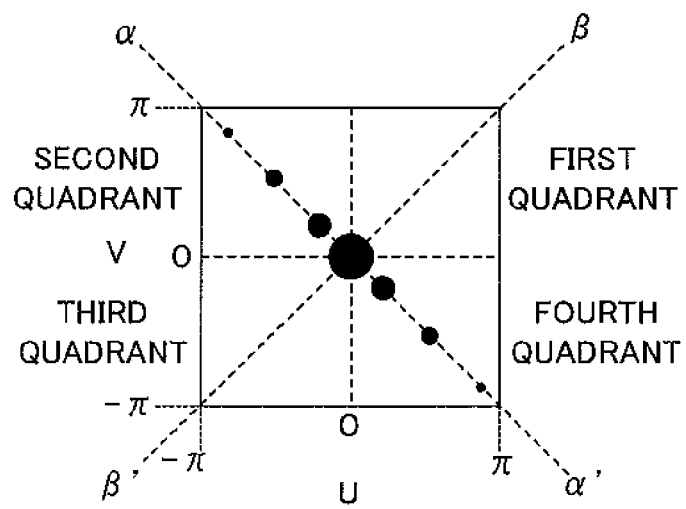
FIG. 6A is a graph showing the two-dimensional frequency spectrum of the image data in FIG. 5B.
Figure 6B:
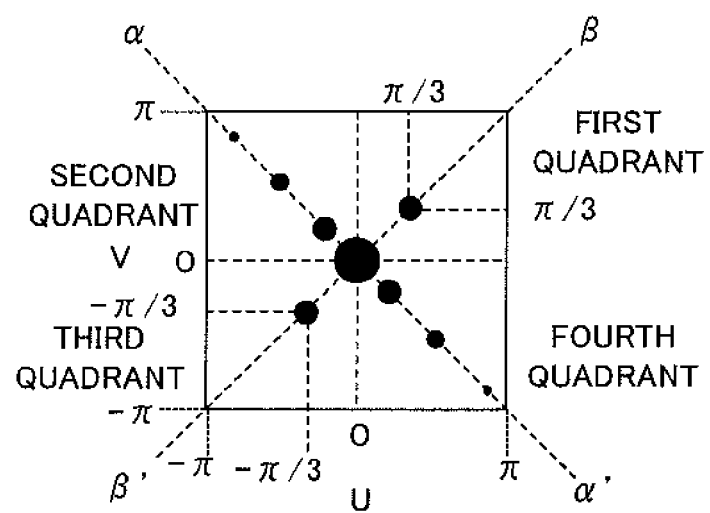
FIG. 6B is a graph showing the two-dimensional frequency spectrum of the image data in FIG. 5C.

FIGS. 6A and 6B show graphs in which the frequency spectrum of the image data obtained by Formula (1) above is plotted in a two-dimensional plane (the u-v plane). In these graphs, the first and third quadrants and the second and fourth quadrants have been respectively switched in relation to the X-Y coordinate axes of the evaluation pattern P in FIG. 3A. In addition, in this graph the origin (center) is a direct current component and the farther out from the origin it is, in other words the more toward the perimeter it is, the higher the spatial frequency is.

FIG. 6A shows the frequency spectrum of the image shot with an optical zoom shown in FIG. 5B. As shown in FIG. 6A, with an optical zoom, in the frequency spectrum resulting from the two-dimensional Fourier transform the non-zero spectrum components are expressed by the α-α' cross-section corresponding to the A-A' direction in the evaluation pattern P (see FIG. 3A). The direction of the α-α' cross-section is equivalent to the direction in which waves advance when the evaluation pattern P (periodic pattern) is thought of as waves. That the frequency spectrum appears in the second quadrant and the fourth quadrant by the point symmetry calling the center the origin is because negative and positive Fourier solutions are calculated. The computer 3 may use the spectrum components of the frequency spectrum in either quadrant in analyzing image quality.

Figure 7A:
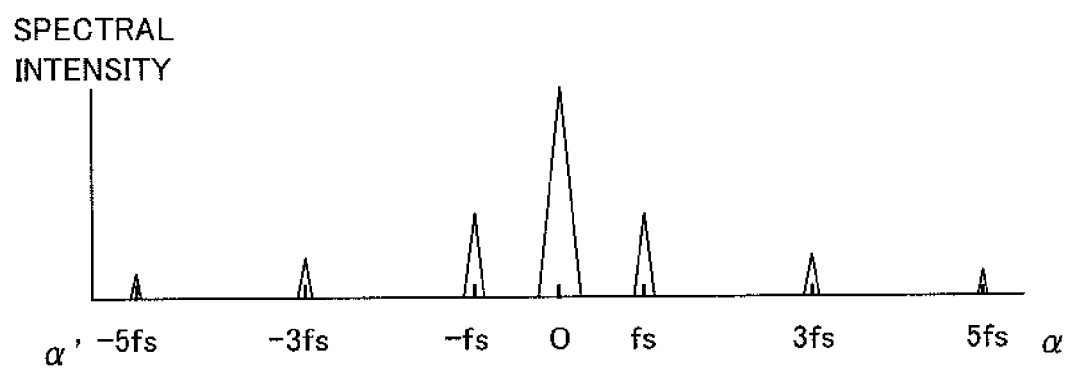
FIG. 7A is the spatial frequency spectrum along a cross-section α-α' in FIG. 6A.
Figure 7B:
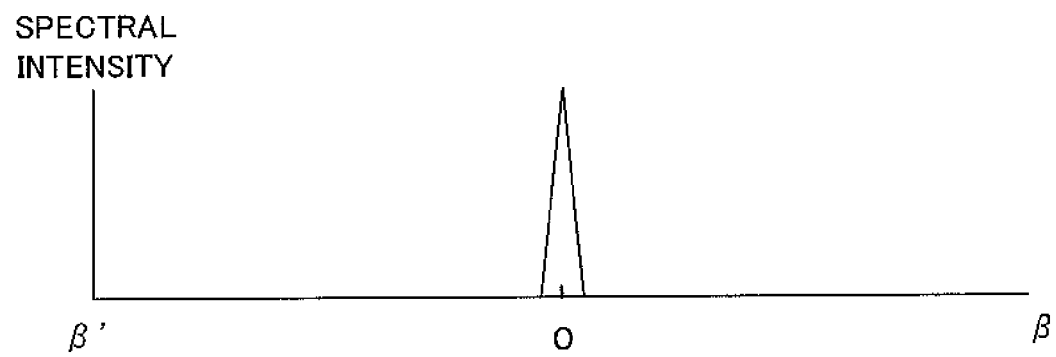
FIG. 7B is the spatial frequency spectrum along a cross-section β-β' in FIG. 6A.

The frequency spectrum of the optical zoom image along the α-α' cross-section in FIG. 6A is shown in FIG. 7A. In addition, the frequency spectrum of the optical zoom image along the β-β' cross-section in FIG. 6A is shown in FIG. 7B. In both FIGS. 7A and 7B, the vertical axis represents spectral intensity and the horizontal axis represents spatial frequency.

In the case of an optical zoom, burring and jaggies do not occur at the edges of the image enlarged and photographed, so the square waveform of the evaluation pattern P is maintained (see image data P1 in FIG. 5B). Accordingly, letting fs be the spatial frequency of the square waveform in the evaluation pattern P, peaks in spectrum components occur at the spatial frequencies 3fs and 5fs, which coincide with the odd-order high-frequency components.

On the other hand, in the image data P1 (see FIG. 5B), no periodic pattern exists in the B-B' direction, so no spectrum components exist for the basic spatial frequency fs or the high frequency spatial frequencies 3fs and 5fs on the β-β' cross-section. Accordingly, only the direct current components can be observed as spectrum components in the β-β' direction, as shown in FIG. 7B.

Figure 8A:
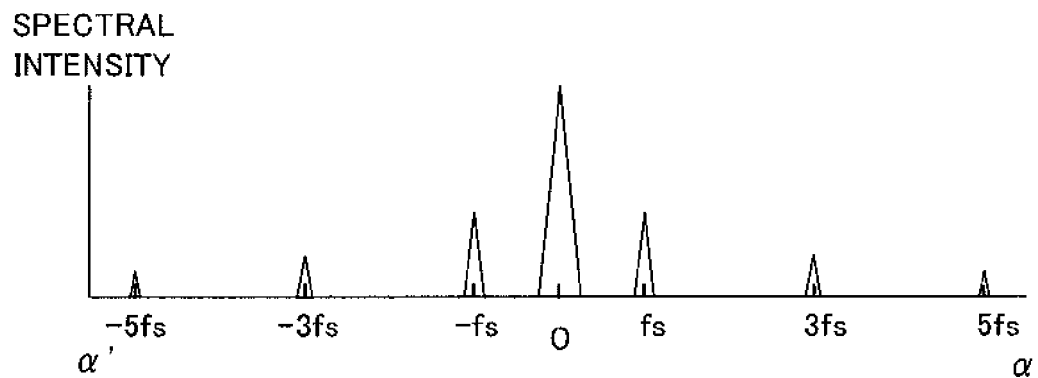
FIG. 8A is the spatial frequency spectrum along a cross-section α-α' in FIG. 6B when the nearest neighbor method is applied.
Figure 8B:
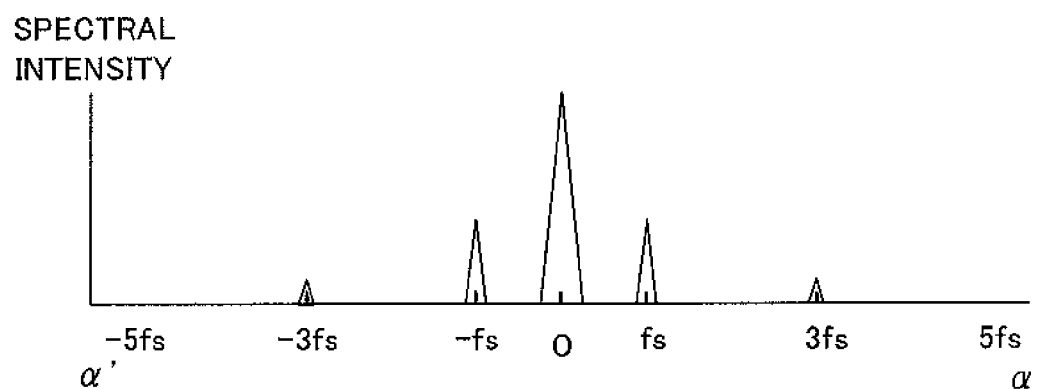
FIG. 8B is the spatial frequency spectrum along a cross-section α-α' in FIG. 6B when the bilinear method is applied.

On the other hand, FIG. 6B shows the frequency spectrum of images shot using a digital zoom. In addition, one example of the frequency spectrum of digital zoom images along the α-α' cross-section in FIG. 6B is shown in FIGS. 8A and 8B. FIG. 8A shows the frequency spectrum when the image is enlarged using the nearest neighbor method. In addition, FIG. 8B shows the frequency spectrum when the image is enlarged using the bilinear method.

When the nearest neighbor method is applied, there is little blurring of the image, so the same frequency spectrum as in FIG. 7A can be observed, as shown in FIG. 8A. In other words, by utilizing the nearest neighbor method, the same resolution can be obtained as in FIG. 8A.

In contrast, when the generally used bilinear method is applied, the third-order and fifth-order high frequency components at the spatial frequencies 3fs and 5fs become smaller because the image is blurred, as shown in FIG. 8B.

The computer 3 evaluates the resolution of the image by comparing the level and the position (spatial frequency) of the peaks of the spectrum components of the high frequencies.

Figure 8C:
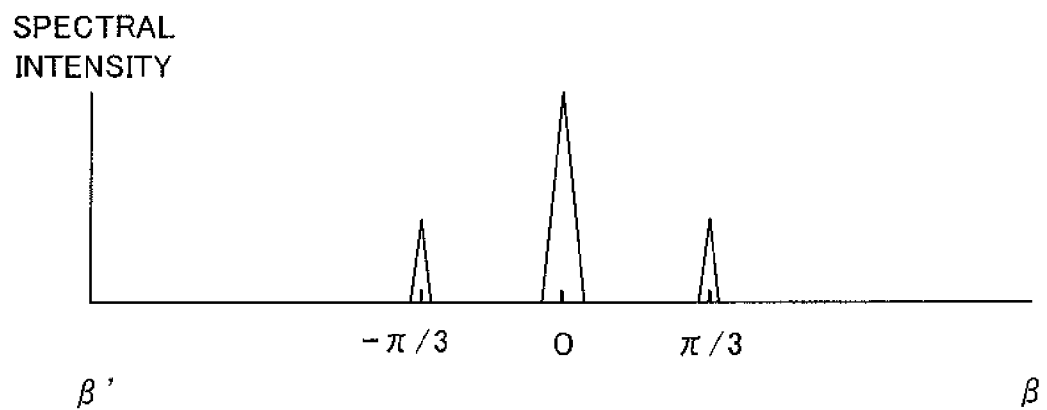
FIG. 8C is the spatial frequency spectrum along a cross-section β-β' in FIG. 6B.

FIG. 8C shows one example of the frequency spectrum of a digital zoom image along the β-β' cross-section in FIG. 6B. Because the repeated frequency of the peaks of the repeatedly occurring jaggies is three pixels, a peak of the spectrum components caused by the jaggies appears at the spatial frequency π/3, as shown in FIG. 8C. This spectrum component cannot be seen in the spectrum of the optical zoom (see FIG. 7B) that is an example of an ideal zoom, so it can be said to be the deterioration component of the image. Thus, the computer 3 evaluates the degree of quality deterioration caused by jaggies by finding the spectrum components of the frequency spectrum in the β-β' direction.

Figure 9:
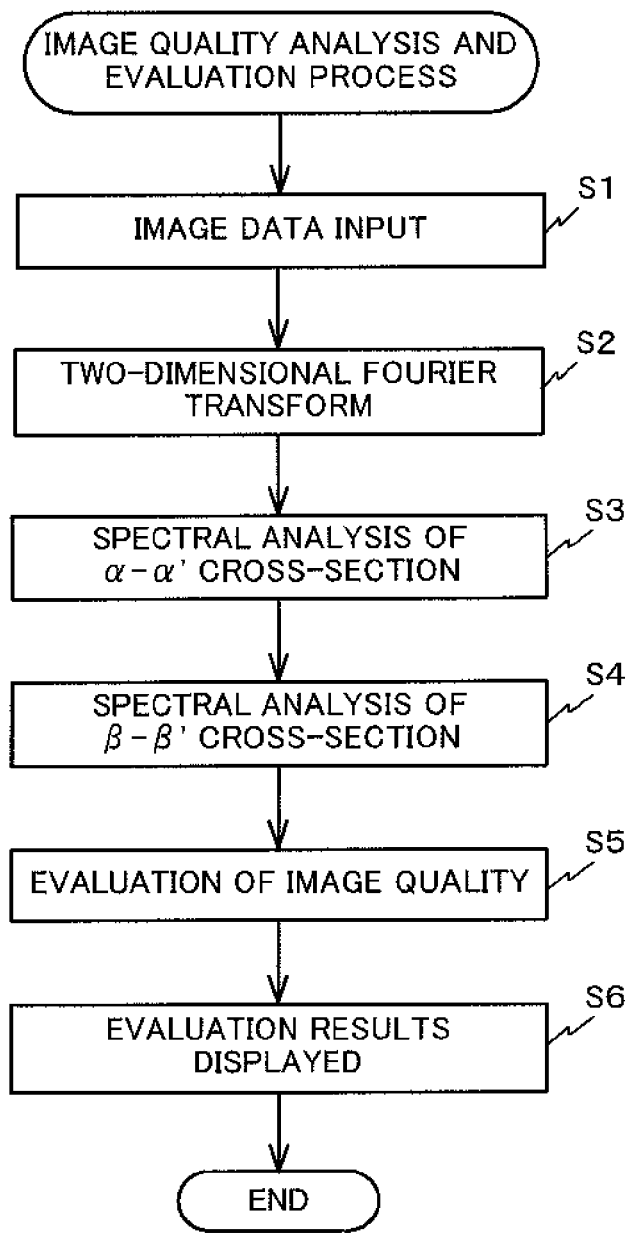
FIG. 9 is a flowchart for an image quality analysis evaluation process executed by the computer 3.

FIG. 9 shows a flowchart of the image quality analysis and evaluation process of the computer 3. As shown in FIG. 9, first the image data sent from the memory card 41 or the mobile phone 1 is input into the image data input unit 50 (step S1). Next, the Fourier transform unit 51 accomplishes a two-dimensional Fourier transform on the input image data (step S2).

Next, the analyzer 52 analyzes the spectrum components in the α-α' cross-section of the two-dimensional plane (u, v) computed from the two-dimensional Fourier transform (step S3). Here, the analyzer 52 compares the spectrum components shown in FIG. 7A and the spectrum components of the α-α' cross-section computed from the two-dimensional Fourier transform, for example, and determines whether or not image blurring has occurred, that is to say to analyze the resolution. More specifically, the analyzer 52 determines whether or not the third-order and fifth-order high frequency components has fallen more than a threshold value.

Next, the analyzer 52 accomplishes spectral analysis of the spatial frequency component in the β-β' cross-section of the two-dimensional plane (u, v) computed from the two-dimensional Fourier transform (step S4). Here, the analyzer 52 analyzes deterioration of the image on the basis of the spatial frequency component in the β-β' cross-section computed from the two-dimensional Fourier transform. More specifically, the analyzer 52 determines whether or not jaggies or noise have occurred in the image by whether or not peaks exist above a predetermined level in the spectrum components in the β-β' cross-section. In addition, the analyzer 52 determines whether or not jaggies have occurred in the image based on whether or not the peak spatial frequency is π/3 (or −π/3). The reason π/3 is found is because the spatial frequency is ⅓ because the image was enlarged three times.

Next, the evaluator 53 comprehensively evaluates the quality of the image data shot by the mobile phone 1 on the basis of the analysis results from the analyzer 52 (step S5). For example, when a peak in a spectrum component larger than a predetermined level cannot be ignored in the part corresponding to the spatial frequency π/3 in the β-β' cross-section, the evaluator 53 evaluates the quality of the image as low because jaggies are occurring even though the high-frequency spectrum components at the spatial frequencies 3fs and 5fs in the α-α' cross-section have not become smaller and the image is not blurred.

Next, the display unit 54 displays the evaluation results from the evaluator 53 (step S6).

As explained in detail above, with the present exemplary embodiment, it is possible to evaluate both the resolution of the image and deterioration of the image, and consequently it is possible to evaluate the quality of the image shot by the mobile phone 1 in a state closer to that seen with the eye.

More specifically, with the present exemplary embodiment, the analyzer 52 analyzes whether or not the components of the evaluation pattern P in the image data are deteriorating, by comparing the spatial frequency spectrum of the evaluation pattern P in the α-α' cross-section of FIG. 6A that has been enlarged by an optical zoom and the spatial frequency spectrum of image data in the α-α' cross-section of FIG. 6B that has been enlarged by an electronic zoom. Through this analysis, it is possible to determine whether or not the image is blurred and to evaluate the resolution of the image.

In addition, the computer 3 analyzes whether or not components not included in the evaluation pattern P in the image (components corresponding to the enlargement ratio of the digital zoom) are included, on the basis of the frequency spectrum components in the β-β' cross-section direction. Through this analysis, it is possible to determine whether or not jaggies or noise are occurring due to the digital zoom, that is to say to evaluate deterioration of the image.

Through this, image quality evaluation becomes possible from the perspectives of both improvement in resolution through image quality correction processing such as strengthening edges in image data expanded and shot with the digital zoom, and deterioration in image quality caused by increased jaggies and noise resulting from the digital zoom. As a result, it is possible to evaluate the quality of the image data shot by the mobile phone 1 in a state closer to that seen by the eye.

In the present exemplary embodiment, it is possible to detect jaggies with high precision because spectrum components of the β-β' cross-section that does not originally have a periodic spectrum component are used.

In the present exemplary embodiment, in order to simplify the explanation one peak each is assumed to occur for the spectrum components of the frequency spectrum in the first quadrant and the third quadrant by the jaggies caused by the digital zoom, as shown in FIG. 6B. However, in reality there are cases in which multiple peaks for spectrum components occur in the first quadrant and the third quadrant. In addition, there are cases in which peaks for spectrum components occur in the second quadrant and the fourth quadrant as well.

In such cases, the computer 3 may take all peaks of spectrum components as analysis subjects, or may create a threshold value for spectral intensity and take only peaks having a spectral intensity greater than the threshold value as the analysis targets.

In addition, analysis may be conducted using the sum of the spectral intensities in all or some of the peaks of the spectrum components, or analysis may be conducted using the average value of the peak values, or analysis may be conducted on the correlation to the spectrum of the optical zoom. In addition, analysis may also be conducted with the maximum value of the peak (the maximum spectral intensity) as the representative value. In addition, because even optical zoom images may accompany with deterioration according to optical system performance, comparison with images electronically created with no deterioration may be accomplished.

Second Exemplary Embodiment

Next, the second exemplary embodiment of the present invention is described. The composition and action of the image quality evaluation system 100 according to the present exemplary embodiment is the same as that shown in FIGS. 1 and 9.

However, in the present exemplary embodiment, the composition of the sensor 44 of the mobile phone 1 differs. In the above-described first exemplary embodiment, a monochrome type was used for the sensor 44 of the mobile phone 1, but in the present exemplary embodiment, the sensor 44 has a color sensor provided with RGB color filters in each pixel.

Figure 10:
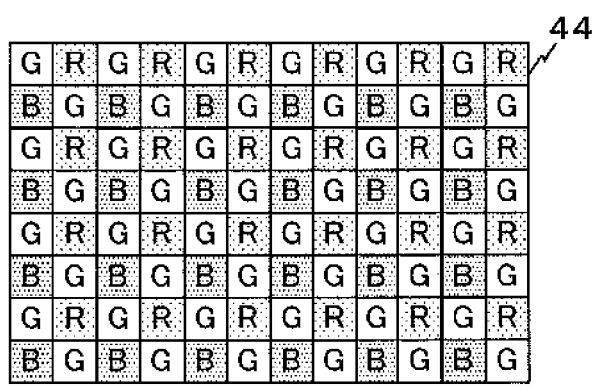
FIG. 10 shows the RGB pixel arrangement in a sensor according to a second exemplary embodiment of the present invention.

FIG. 10 shows the RGB pixel arrangement in the sensor 44. As shown in FIG. 10, G and R are alternately positioned on the first line of this arrangement. In addition, B and G are alternately positioned on the second line. Furthermore, G and R are alternately positioned on the third line. This kind of pixel arrangement is generally called a Bayer arrangement because G is positioned in a staggered pattern on the odd-numbered lines and the even-numbered lines. The Bayer arrangement differs from a stripe arrangement in that the number of R and B pixels is half the number of G pixels.

The mobile phone 1 can shoot both still images and video using the sensor 44. When shooting still images, the time gap between photographs is sufficiently long, excluding continuous shooting, so the readout time for images from the sensor 44 is not much of a problem. Because of this, when shooting still images, it is possible to take the time to read the data from all pixels in the sensor 44.

However, when shooting video, normally a frame rate of 30 fps (frames per second) must be maintained. In order to maintain this frame rate, it is necessary to complete the readout of image data for a single frame in 1/30 of a second. Hence, in general the pixels are thinned and read out from the sensor 44 or the brightness values of several surrounding pixels are added and combined in a single pixel having that summed value as brightness value and read out. Below, the case of reading out the pixel sum from the sensor 44 is explained as an example.

Figure 11A:
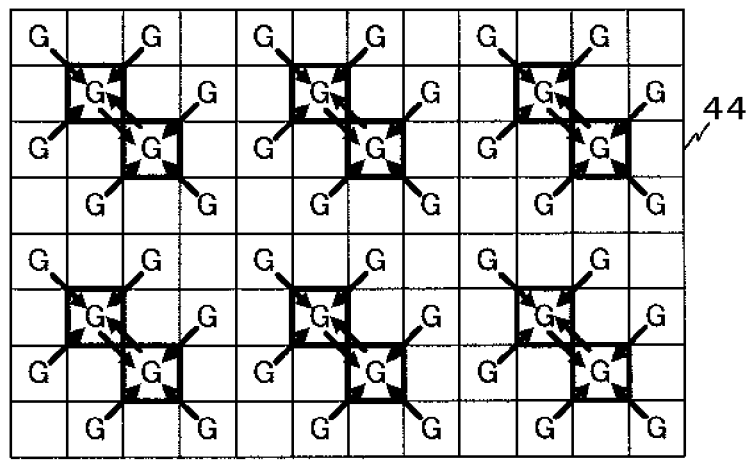
FIG. 11A is a drawing schematically showing the action of reading out G pixel summation in the sensor.
Figure 11B:
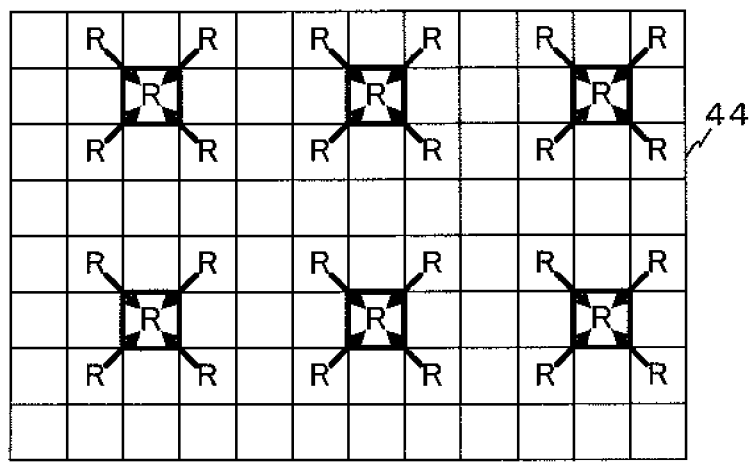
FIG. 11B is a drawing schematically showing the action of reading out R pixel summation in the sensor.
Figure 11C:
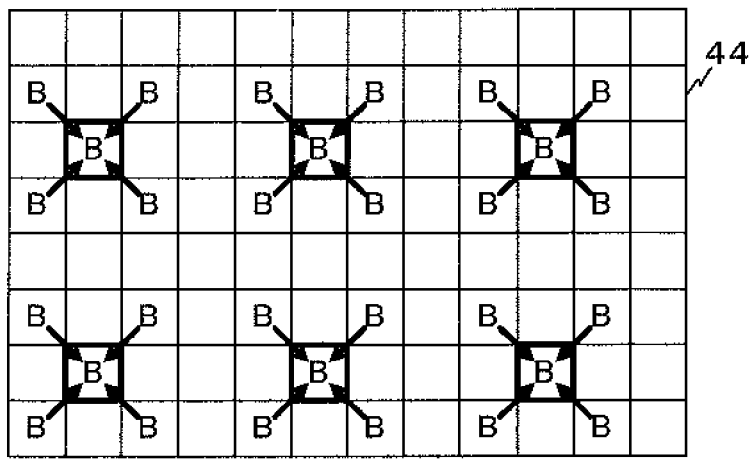
FIG. 11C is a drawing schematically showing the action of reading out B pixel summation in the sensor.

FIG. 11A schematically shows the action of the pixel sum readout of G in the sensor 44. G in FIG. 11A shows the pixel position of G in the sensor 44. In the action of the pixel sum readout, the four G pixels adjacent to the top and bottom and left and right are summed and output as the pixel values for the positions surrounded by bold lines. FIGS. 11B and 11C schematically show the pixel sum readout action for R and B. In both of these, the four G pixels adjacent to the top, bottom, left and right are summed and output the summed value as the pixel value for the position enclosed by the bold lines.

Figure 12A:
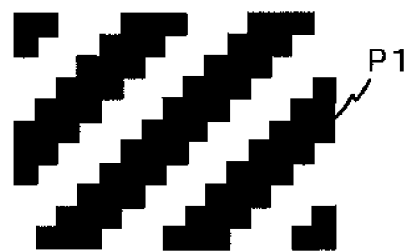
FIG. 12A is one example of the G image data output from the sensor.
Figure 12B:
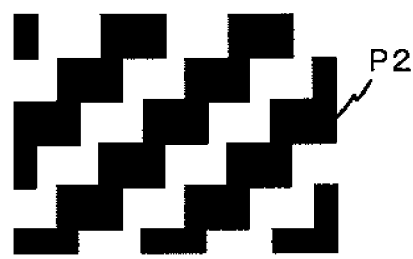
FIG. 12B is one example of the R image data output from the sensor.

Using this kind of pixel sum readout, an example of image data when the evaluation pattern P (see FIG. 3A) is shot is shown in FIGS. 12A and 12B. FIG. 12A shows one example of the G image data output from the sensor 44. In addition, FIG. 12B shows one example of the R image data output from the sensor 44. The B image data output from the sensor 44 is substantially the same as that of the R, so explanation of such is omitted here.

With the G pixel data, the horizontal and vertical resolution is ½ from the pixel sum, so that image data becomes an image with jaggies occurring in a period of two pixels, as shown in FIG. 12A. On the other hand, the number of pixels of R image data is ¼ that of the G image data, so that image data becomes an image with jaggies occurring in a period of four pixels, as shown in FIG. 12B.

Figure 13A:
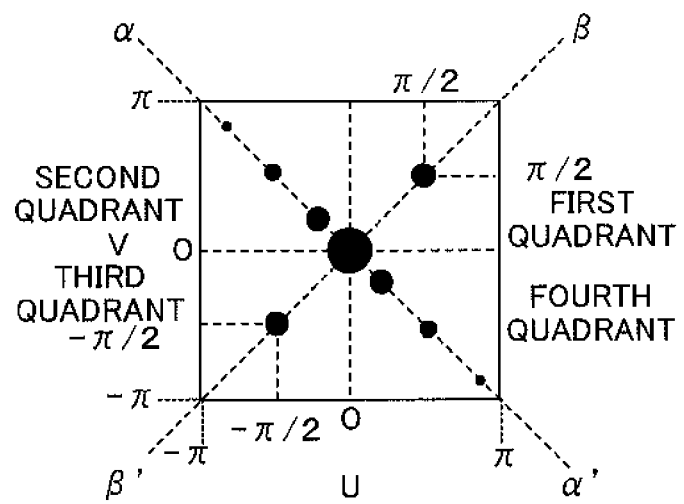
FIG. 13A is one example of the spatial frequency spectrum of the G image data.
Figure 13B:
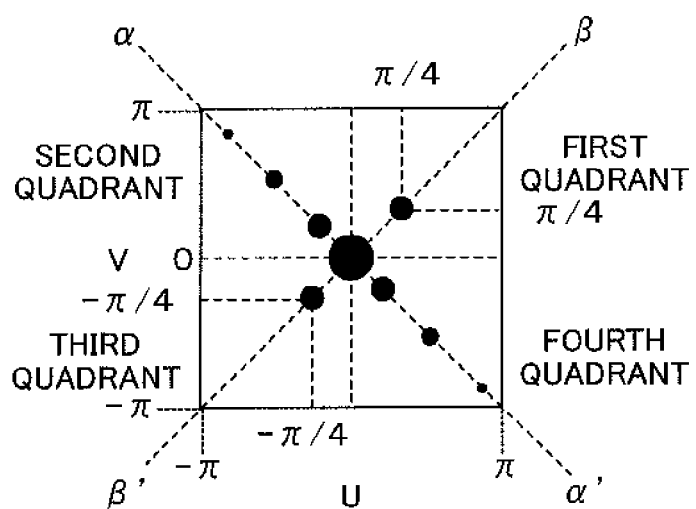
FIG. 13B is one example of the spatial frequency spectrum of the R image data.

One example of a two-dimensional frequency spectrum obtained by the computer 3 is shown in FIGS. 13A and 13B.

FIG. 13A shows one example of the spatial frequency spectrum of the G image data (see FIG. 12A). Similar to the above-described first exemplary embodiment, when the line of the evaluation pattern P is thought of as a square wave, a peak in the spectrum component of the evaluation pattern P appears in the direction in which the square wave advances, that is to say along the α-α' cross-section. The analyzer 52 evaluates the resolution of the image by analyzing the spectrum components along the α-α' cross-section, the same as in the above-described first exemplary embodiment.

Figure 14A:
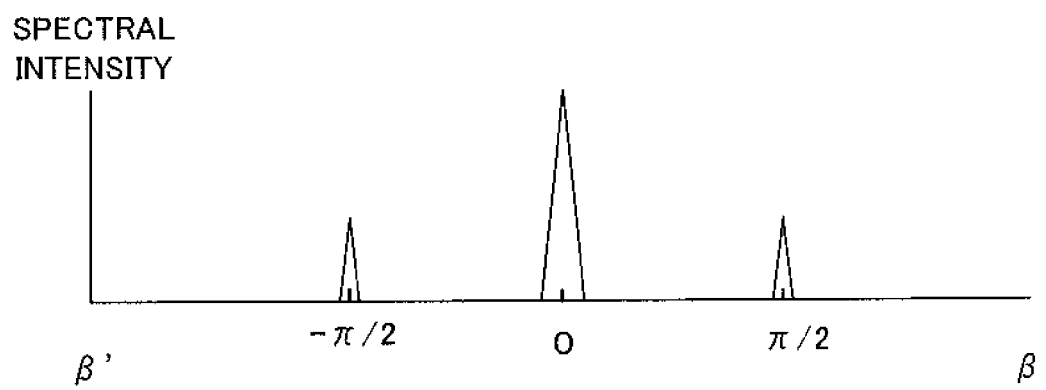
FIG. 14A shows one example of the spatial frequency spectrum along the cross-section β-β' of FIG. 13A.

In addition, FIG. 14A shows the spectrum components along the β-β' cross-section in FIG. 13A. The analyzer 52 evaluates deterioration of the image by analyzing the spectrum components along the β-β' cross-section, the same as in the above-described first exemplary embodiment.

In the above-described first exemplary embodiment, the analyzer 52 detected jaggies occurring because of digital zoom, but in the present exemplary embodiment, jaggies caused by pixel summation of G image data are detected. Jaggies caused by pixel summation of G image data occur with a period of two pixels, so the analyzer 52 detects the occurrence of jaggies caused by G pixel summation by measuring the peak of the spectrum components at the spatial frequency π/2.

On the other hand, FIG. 13B shows one example of the spatial frequency spectrum of the R image data (see FIG. 12B). As shown in FIG. 13B, peaks of spectrum components of the evaluation pattern P are observed on the α-α' cross-section, and spectrum components corresponding to jaggies occurring because of pixel summation are observed on the β-β' cross-section.

Figure 14B:
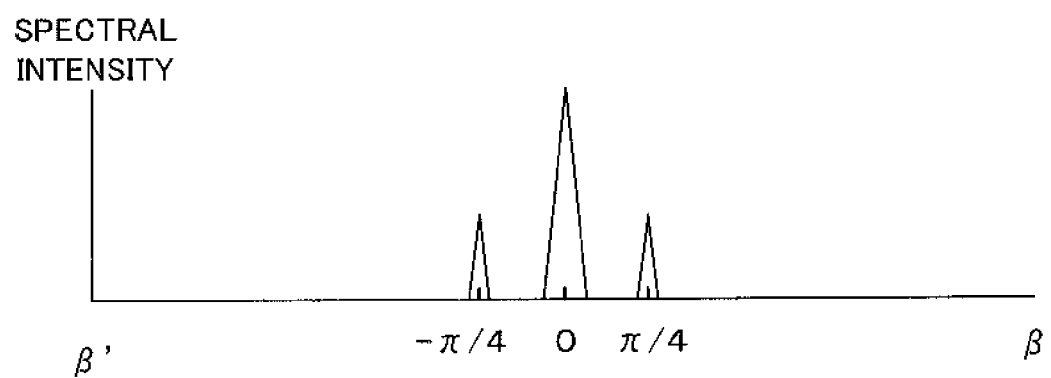
FIG. 14B shows one example of the spatial frequency spectrum along the cross-section β-β' of FIG. 13B.

In addition, FIG. 14B shows the spectrum components on the β-β' cross-section of FIG. 13B.

Jaggies caused by pixel summation of R image data occur with a period of four pixels, so the analyzer 52 detects the occurrence of jaggies caused by R pixel summation by measuring the peak of the spectrum components at the spatial frequency π/4.

As explained in detail above, with the present exemplary embodiment, it is possible to predict the spatial frequency where peaks of the spectrum components will appear using the evaluation pattern P, so the computer 3 can separately analyze spectrum components of spatial frequencies caused by pixel summation and factors other than that. In other words, even when pixel summation and a digital zoom are both applied, it is possible to do analysis while distinguishing the peaks of the spectrum components caused by jaggies.

Analysis of the frequency spectrum according to the present exemplary embodiment is also possible for R, G and B image data prior to YUV conversion. For example, even with images that have undergoing YUV conversion by the ISP 45 or the CPU 35 analysis of each color R, G and B is possible by converting to R, G and B image data using the computer 3. In addition, even with images compressed using JPEG or MPEG by the ISP 45 or the CPU 35, analysis of each color is possible by converting to R, G and B image data after decompressing with the computer 3.

Embodiment 3

Next, a third exemplary embodiment of the present invention is described.

In the above-described first exemplary embodiment, the case was explained wherein image quality is evaluated by paying attention to jaggies caused by the digital zoom. In addition, in the above-described second exemplary embodiment the case of evaluating jaggies caused by pixel summation was explained. In contrast, in the present exemplary embodiment, the case will be explained for evaluating distortion (block noise or mosquito noise) generated by digital compression.

With MPEG, an image data compression process is accomplished in block units called macro blocks composed of 16 pixels horizontally and 16 pixels vertically. Accordingly, in this image data, distortion occurs readily in macro block units. Distortion caused by the MPEG compression process can also be evaluated by frequency spectrum analysis by the computer 3.

Figure 15:
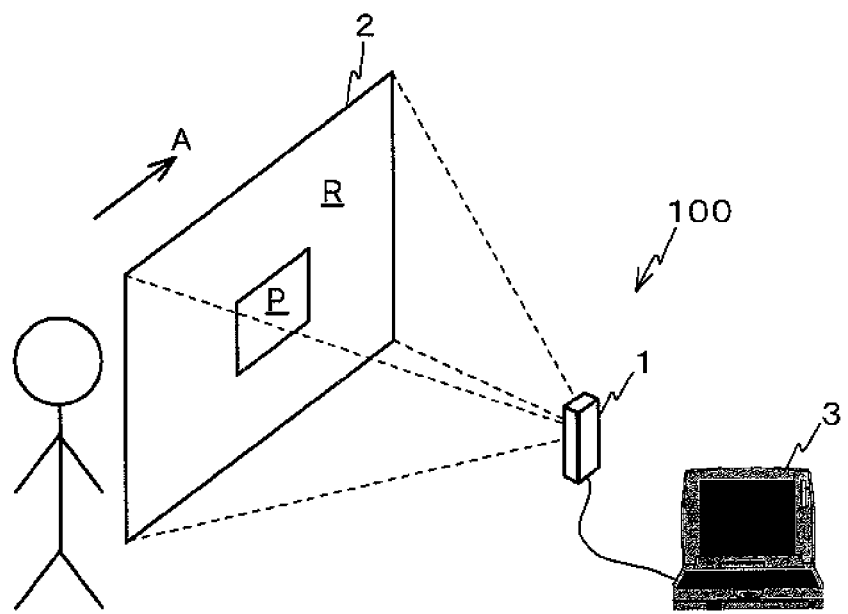
FIG. 15 is an oblique view of the entire composition of an image quality evaluation system 100 according to a third exemplary embodiment of the present invention.

FIG. 15 shows the entire composition of an image quality evaluation system 100 according to the third exemplary embodiment of the present invention. As shown in FIG. 15, the display device 2 displays an evaluation pattern R, but the evaluation pattern R is a pattern with a moving background superimposed on the evaluation pattern P that is a periodic pattern of square waveforms in an inclined direction.

As this background, it is possible to utilize the state of a person moving in the direction indicated by the arrow a. Through this, video is shot by the mobile phone 1 in a state in which the state of the person moving in the direction of the arrow a is superimposed on the evaluation pattern P. Giving motion to the background image of the evaluation pattern P in this manner is because the more moving parts in the image, the more noticeable the above-described distortion becomes. Constituent elements that are the same as in the above-described exemplary embodiments are labeled with the same reference numbers, and redundant explanation is omitted.

Figure 16A:
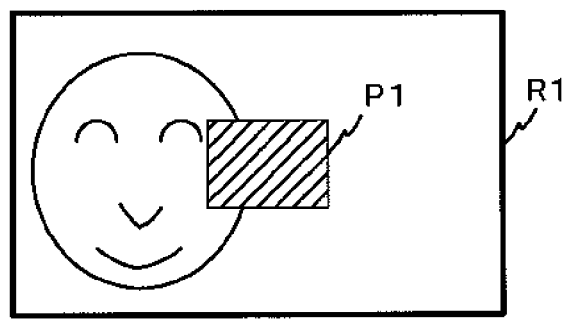
FIG. 16A shows one example of the image data shot by a mobile phone.
Figure 16B:
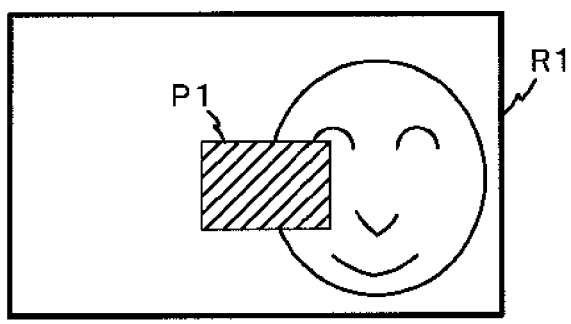
FIG. 16B shows one example of the image data shot by a mobile phone.

One example of the image data R1 shot by the mobile phone 1 is shown in FIGS. 16A and 16B. The background person is taken to be at the position shown in FIG. 16A at a time t1. Following this, the person moves in the "a" direction (see FIG. 15) and moves to the right side as shown in FIG. 16B at a time t2. On the other hand, the evaluation pattern P displayed by the display device 2 does not move and thus is displayed at the same position on the screen (image P1). The evaluation pattern P is fixed near the center of the screen of the display device 2 but may be fixed at any position in the screen.

The CPU 35 of the mobile phone 1 creates an image file by compressing with MPEG the image data shot at a frame rate of 30 fps during the interval from time t1 to time t2, and stores the result in the memory 28 or on the memory card 41. This image file is captured by the computer 3 via the memory card 41 or the external I/F 42. The captured image file is decompressed by the computer 3, a two-dimensional Fourier transform is performed on an arbitrary one frame of image data and image compression distortion caused by MPEG is evaluated by analyzing the frequency spectrum.

Figure 17:
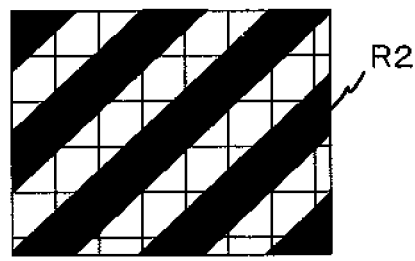
FIG. 17 is one example of image data in which distortion caused by MPEG digital compression is overlaid by the movement of a background.

One example of the image R2 on which the analysis process is conducted by the computer 3 is shown in FIG. 17. As shown in FIG. 17, the image R2 is an image in which distortion caused by MPEG compression is overlaid on the evaluation pattern P by movement of the background. The result of performing a two-dimensional Fourier transform on this image data is shown in FIG. 18.

Figure 18:
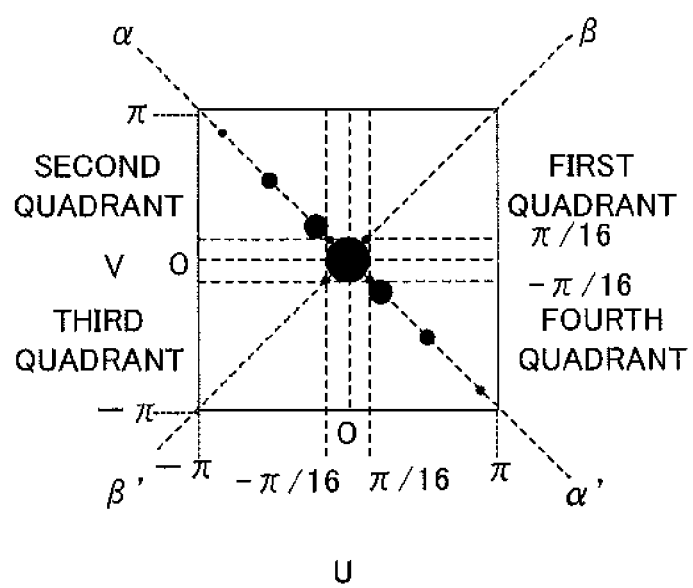
FIG. 18 is one example of the spatial frequency spectrum obtained through a two-dimensional Fourier transform on the image data of FIG. 17.
Figure 19A:
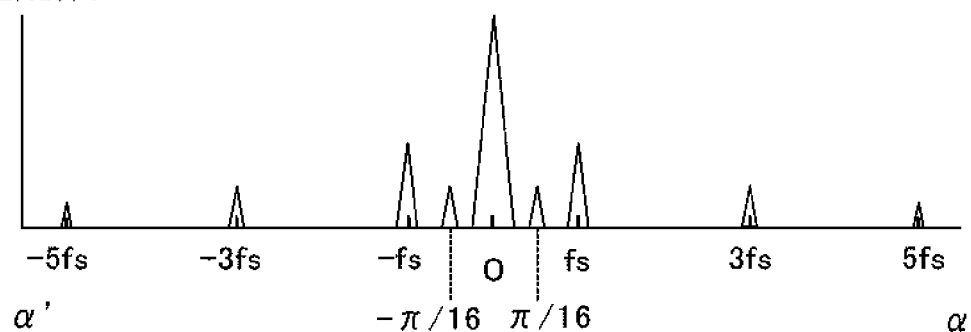
FIG. 19A is the spatial frequency spectrum along a cross-section α-α' in FIG. 18.
Figure 19B:
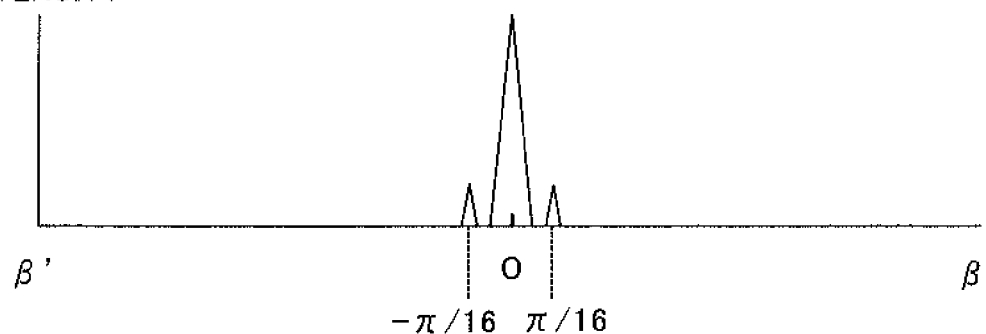
FIG. 19B is the spatial frequency spectrum along a cross-section β-β' in FIG. 18.

The spectrum components along the α-α' cross-section of FIG. 18 are shown in FIG. 19A. In addition to the peaks of the spectrum components of the square wave similar to the above-described exemplary embodiments, a peak of the spectrum components also appears at the spatial frequency $\pi/16$ because of the distortion in 16-pixel units. This peak is separate from the peaks caused by the evaluation pattern P on the frequency axis, so it is possible to evaluate such separately from the square wave. On the other hand, in the spectrum components along the β-β' cross-section as well, a component of distortion caused by MPEG compression appears at $\pi/16$, as shown in FIG. 19B. The analyzer 52 evaluates compression distortion caused by MPEG by measuring these spectral peaks.

In the present exemplary embodiment, the case of using MPEG as the digital compression format was explained. However, the present invention is not restricted to this. For example, other formats such as H.264 may be used as the digital compression method. In addition, in the case of still images, a digital compression format for still images such as JPEG may be utilized.

As explained in detail above, with the present exemplary embodiment, it is possible to predict the spatial frequencies at which peaks in the frequency spectrums occur because of distorted pixel units that should be evaluated, so it is possible to evaluate by extracting only the distortion caused by the target factor. Accordingly, even in images in which distortion caused by image enlargement, pixel summation and MPEG are intermixed, if the enlargement ratio, number of pixels summed and number of pixels in the macro block are already known, it is possible to evaluate by each factor.

In addition, when spectrum components having a peak at $\pi/16$ overlap the spectrum of the direct current components in the center and are difficult to analyze, the size of the evaluation pattern P may be reduced or the area in the angle of view may be reduced by extending the shooting distance so that the distribution of the direct current component is reduced. In addition, the area of the image where spectral analysis is accomplished by the computer 3 may be limited.

In addition, the size of the macro blocks is not limited to 16 pixel units and may be set to any size in accordance with the compression algorithm. In this case, it is preferable for the size of the evaluation pattern P and the shooting distance to be adjusted so that the frequency spectrum can be easily observed.

In the above-described exemplary embodiments, the direction of the square wave of the evaluation pattern P was 45°, but this does not necessarily need to be 45°. In addition, the evaluation pattern P may be transmissive or reflective.

In addition, in the above-described exemplary embodiments, evaluation of the quality of the image data was accomplished by the computer 3, but evaluation of the quality of data in the image may be accomplished by the mobile phone 1.

In addition, in the above-described exemplary embodiments, the display device 34 was a liquid crystal display, but the display device 34 may be a self-luminescent organic EL display.

In the above-described exemplary embodiments, the terminal device was the mobile phone 1, but the present invention is not limited to this. For example, the terminal device may be a general terminal device capable of shooting video, such as a PHS (Personal Handy-Phone System), a PDA (Personal Digital Assistant), a computer, a digital camera, a digital movie or a video recording device or the like.

In the above-described exemplary embodiments, the system for executing the above-described processes may be composed by storing the executed program on a computer-readable recording medium such as a flexible disk, a CD-ROM (Compact Disk Read-Only Memory), a DVD (Digital Versatile Disk), an MO (Magneto-Optical Disk) or the like and distributing this recording medium and installing that program.

In addition, by storing the program on a disk device possessed by a prescribed server device on a communications network such as the Internet, the program may be downloaded via carrier waves.

In addition, when the above-described functions are allocated to and realized by an OS (Operating System) or are realized by cooperation between an OS and applications, the portions other than the OS may be stored on a medium and distributed, and in addition may be downloaded or the like.

This invention is not limited by the form and the drawing of the above-described exemplary embodiments. Of course it is possible to make a change to the form and the drawing of embodiment insofar as the summary of this invention is not changed.

All or a portion of the above-described exemplary embodiments may be noted in the further exemplary embodiment below but are not limited thereby.

Further Exemplary Embodiment 1

An image quality evaluation device for evaluating the quality of an image obtained by shooting a photographic subject including a periodic pattern that fluctuates periodically in one direction, wherein the image quality evaluation device includes:

a Fourier transform unit that accomplishes a two-dimensional Fourier transform on the image to obtain two-dimensional spatial frequency spectrum components; and an analysis unit that, among the two-dimensional spatial frequency spectrum components obtained by the Fourier transform unit, analyzes the resolution of the image on the basis of spectrum components of spatial frequencies included in the periodic pattern, and analyzes the deterioration of the image on the basis of spectrum components other than these.

Further Exemplary Embodiment 2

The image quality evaluation device according to Further exemplary embodiment 1,
wherein:
the periodic pattern has a square wave shape; and
the analysis unit analyzes the resolution of the image on the basis of spectrum components relating to a first direction corresponding to the direction in which the periodic pattern periodically fluctuates, and
analyzes deterioration of the image on the basis of spectrum components relating to a second direction orthogonal to the first direction.

Further Exemplary Embodiment 3

The image quality evaluation device according to Further exemplary embodiment 1 or Further exemplary embodiment 2, wherein:
the image is an image enlarged by digital zoom, and
the analysis unit determines whether or not jaggies have occurred on the basis of the spectrum components of spatial frequencies corresponding to the enlargement ratio of the image.

Further Exemplary Embodiment 4

The image quality evaluation device according to any of Further exemplary embodiment 1 through Further exemplary embodiment 3, wherein:
the image is an image in which various pixels in the original image have been periodically thinned, or an image in which multiple pixels in the original image have been periodically summed on brightness; and
the analysis unit determines whether or not jaggies have occurred on the basis of the spectrum components of spatial frequencies corresponding to the period of the thinning or the brightness summing.

Further Exemplary Embodiment 5

The image quality evaluation device according to any of Further exemplary embodiment 1 through Further exemplary embodiment 4, wherein:
the image is R, G and B images that make up a color image;
the Fourier transform unit obtains the two-dimensional spatial frequency spectrum components by performing a two-dimensional Fourier transform on each of the R, G and B images; and
the analysis unit analyzes the resolution of the image and the deterioration of the image on the basis of the spectrum components of the two-dimensional spatial frequencies of each of the R, G and B images.

Further Exemplary Embodiment 6

The image quality evaluation device according to any of Further exemplary embodiment 1 through Further exemplary embodiment 5, wherein:
the image is an image digitally compressed by a prescribed method; and
the analysis unit determines whether or not the image has deteriorated through the digital compression process on the basis of the spectrum components of the spatial frequencies corresponding to blocks that are compression units of the digital compression.

Further Exemplary Embodiment 7

The image quality evaluation device according to any of Further exemplary embodiment 1 through Further exemplary embodiment 6, wherein:
the analysis unit analyzes the resolution of the image and deterioration of the image on the basis of the peaks of all spectrum components, peaks having a spectral intensity above a predetermined threshold value, or the average value, the sum or the maximum value of the peak values of all or a portion of the spectrum components.

Further Exemplary Embodiment 8

The image quality evaluation device according to any of Further exemplary embodiment 1 through Further exemplary embodiment 7, further including a photography device.

Further Exemplary Embodiment 9

The image quality evaluation device according to any of Further exemplary embodiment 1 through Further exemplary embodiment 8, further including a display device for displaying the periodic pattern to enable shooting.

Further Exemplary Embodiment 10

The image quality evaluation device according to Further exemplary embodiment 9, wherein the display device displays a pattern with a moving background superimposed on the periodic pattern.

Further Exemplary Embodiment 11

An image quality evaluation method for evaluating the quality of an image obtained by shooting a photographic subject including a periodic pattern that fluctuates periodically in one direction, wherein the image quality evaluation method includes:

a Fourier transform process that accomplishes a two-dimensional Fourier transform on the image to obtain two-dimensional spatial frequency spectrum components; and an analysis process that, among the two-dimensional spatial frequency spectrum components obtained in the Fourier transform process, analyzes the resolution of the image on the basis of spectrum components of spatial frequencies included in the periodic pattern, and analyzes the deterioration of the image on the basis of spectrum components other than these.

Further Exemplary Embodiment 12

A computer-readable recording medium for storing a program for evaluating the quality of an image obtained by shooting a photographic subject including a periodic pattern that fluctuates periodically in one direction, this program causing a computer to function as:

a Fourier transform means that accomplishes a two-dimensional Fourier transform on the image to obtain two-dimensional spatial frequency spectrum components; and an analysis unit means, among the two-dimensional spatial frequency spectrum components obtained by the Fourier transform means, analyzes the resolution of the image on the basis of spectrum components of spatial frequencies included in the periodic pattern, and analyzes the deterioration of the image on the basis of spectrum components other than these.

Further Exemplary Embodiment 13

An image quality evaluation device for evaluating the quality of an image obtained by shooting a photographic subject including a periodic pattern that fluctuates periodically in one direction, wherein the image quality evaluation device includes:

a Fourier transform means that accomplishes a two-dimensional Fourier transform on the image to obtain two-dimensional spatial frequency spectrum components; and an analysis means that, among the two-dimensional spatial frequency spectrum components obtained by the Fourier transform means, analyzes the resolution of the image on the basis of spectrum components of spatial frequencies included in the periodic pattern, and analyzes the deterioration of the image on the basis of spectrum components other than these.

INDUSTRIAL APPLICABILITY

The present invention is suitable for analysis and evaluation of images.

What is claimed is:

1. An image quality evaluation device for evaluating the quality of an image in which various pixels in the original image have been periodically thinned, or an image in which multiple pixels in the original image have been periodically summed on brightness, obtained by a shooting photographic subject including a periodic pattern that fluctuates periodically in one direction, wherein the image quality evaluation device includes:

a Fourier transform unit that accomplishes a two-dimensional Fourier transform on the image to obtain two-dimensional spatial frequency spectrum components; and an analysis unit that, among the two-dimensional spatial frequency spectrum components obtained by the Fourier transform unit, analyzes the resolution of the image on the basis of spectrum components of spatial frequencies included in the periodic pattern, and analyzes the deterioration of the image on the basis of spectrum components other than these;

wherein the analysis unit determines whether or not jaggies have occurred on the basis of the spectrum components of spatial frequencies corresponding to the period of the thinning or the brightness summing.

2. The image quality evaluation device according to claim 1, wherein:

the periodic pattern has a square wave shape; and the analysis unit analyzes the resolution of the image on the basis of spectrum components relating to a first direction corresponding to the direction in which the periodic pattern periodically fluctuates, and analyzes deterioration of the image on the basis of spectrum components relating to a second direction orthogonal to the first direction.

3. The image quality evaluation device according to claim 2, wherein:

the image is R, G and B images that make up a color image;

the Fourier transform unit obtains the two-dimensional spatial frequency spectrum components by performing a two-dimensional Fourier transform on each of the R, G and B images; and the analysis unit analyzes the resolution of the image and the deterioration of the image on the basis of the spectrum components of the two-dimensional spatial frequencies of each of the R, G and B images.

4. The image quality evaluation device according to claim 2, wherein:

the analysis unit analyzes the resolution of the image and deterioration of the image on the basis of the peaks of all spectrum components, peaks having a spectral intensity above a predetermined threshold value, or the average value, the sum or the maximum value of the peak values of all or a portion of the spectrum components.

5. The image quality evaluation device according to claim 2, further comprising a display device for displaying the periodic pattern to enable shooting.

6. The image quality evaluation device according to claim 1, wherein:

the image is R, G and B images that make up a color image;

the Fourier transform unit obtains the two-dimensional spatial frequency spectrum components by performing a two-dimensional Fourier transform on each of the R, G and B images; and the analysis unit analyzes the resolution of the image and the deterioration of the image on the basis of the spectrum components of the two-dimensional spatial frequencies of each of the R, G and B images.

7. The image quality evaluation device according to claim 1, wherein:

the analysis unit analyzes the resolution of the image and deterioration of the image on the basis of the peaks of all spectrum components, peaks having a spectral intensity above a predetermined threshold value, or the average value, the sum or the maximum value of the peak values of all or a portion of the spectrum components.

8. The image quality evaluation device according to claim 1, further comprising a photography device.

9. The image quality evaluation device according to claim 8, further comprising a display device for displaying the periodic pattern to enable shooting.

10. The image quality evaluation device according to claim 1, further comprising a display device for displaying the periodic pattern to enable shooting.

11. An image quality evaluation method for evaluating the quality of an image in which various pixels in the original image have been periodically thinned, or an image in which multiple pixels in the original image have been periodically summed on brightness, obtained by shooting a photographic subject including a periodic pattern that fluctuates periodically in one direction, wherein the image quality evaluation method includes:

a Fourier transform process that accomplishes a two-dimensional Fourier transform on the image to obtain two-dimensional spatial frequency spectrum components; and an analysis process that, among the two-dimensional spatial frequency spectrum components obtained in the Fourier transform process, analyzes the resolution of the image on the basis of the spectrum components of spatial frequencies included in the periodic pattern, and analyzes the deterioration of the image on the basis of spectrum components other than these, wherein the analysis unit determines whether or not jaggies have occurred on the basis of the spectrum components of spatial frequencies corresponding to the period of the thinning or the brightness summing.

12. A non-transitory computer-readable recording medium for storing a program for evaluating the quality of an image in which various pixels in the original image have been periodically thinned, or an image in which multiple pixels in the original image have been periodically summed on brightness, obtained by shooting a photographic subject including a periodic pattern that fluctuates periodically in one direction, this program causing a computer to function as: a Fourier transform means that accomplishes a two-dimensional Fourier transform on the image to obtain two-dimensional spatial frequency spectrum components; and an analysis means that, among the two-dimensional spatial frequency spectrum components obtained by the Fourier transform means, analyzes the resolution of the image on the basis of spectrum components of spatial frequencies included in the periodic pattern, and analyzes the deterioration of the image on the basis of spectrum components other than these, wherein the analysis unit determines whether or not jaggies have occurred on the basis of the spectrum components of spatial frequencies corresponding to the period of the thinning or the brightness summing.

* * * * *